UNITED STATES PATENT OFFICE.

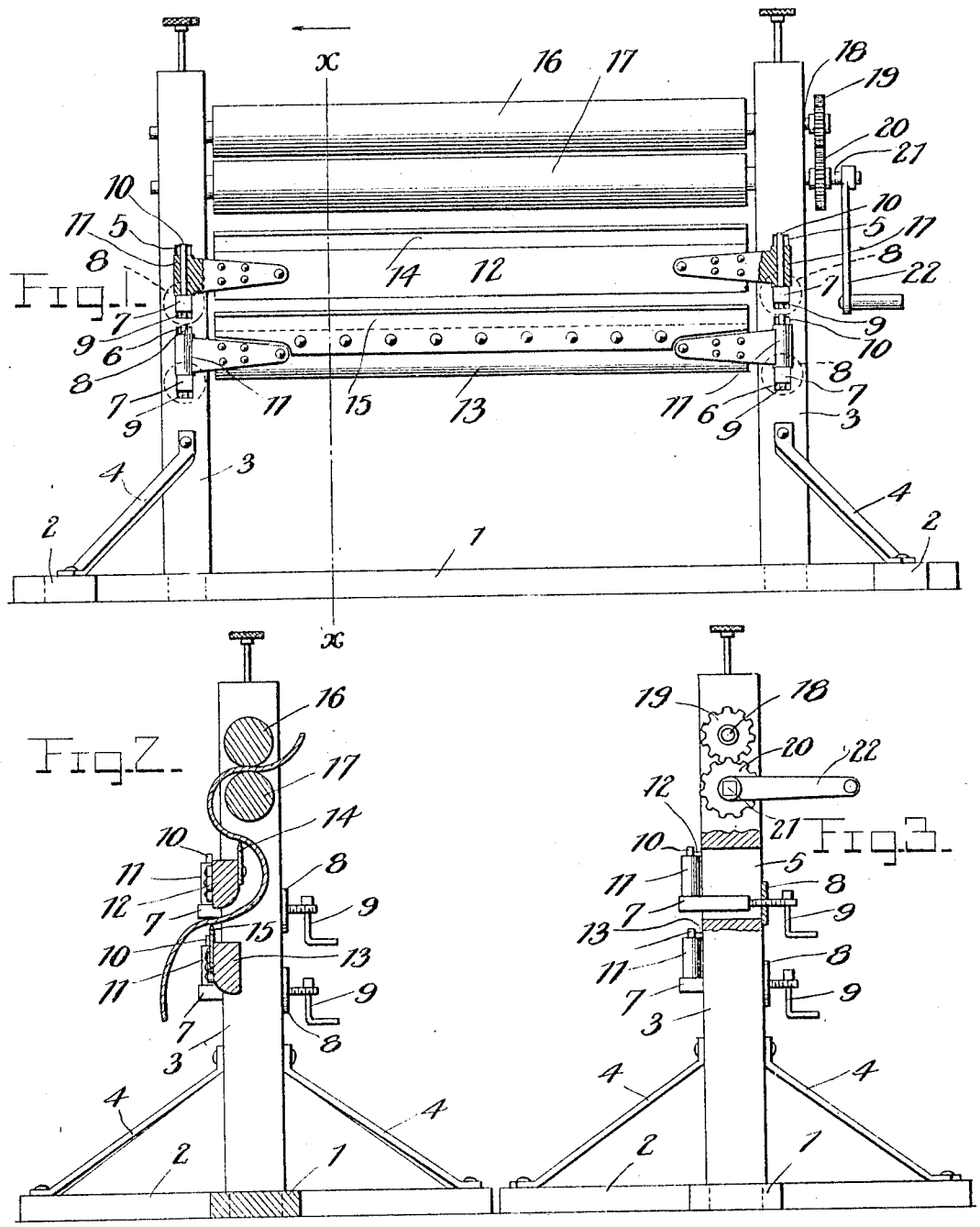

WILLIAM P. BOAK, OF KOSHKONONG, MISSOURI.

LEATHER-TREATING MACHINE.

950,430. Specification of Letters Patent. Patented Feb. 22, 1910.

Application filed November 30, 1908, Serial No. 465,196. Renewed January 3, 1910. Serial No. 536,170.

*To all whom it may concern:*

Be it known that I, WILLIAM P. BOAK, a citizen of the United States, residing at Koshkonong, in the county of Oregon and State of Missouri, have invented certain new and useful Improvements in Leather-Treating Machines; and I do declare the following to be a full, clear, and exact description of the invention, such as will enable others skilled in the art to which it appertains to make and use the same.

My invention relates to leather working or currying machines.

The object of the invention is to provide a device of this character which will be simple in construction, cheap to manufacture and which is sufficiently light to be portable.

A further object of the invention is the provision of means for adjusting the currying knives whereby different sized hides may be properly worked.

With these and other objects in view, the invention consists of certain novel features of construction, combination and arrangement of parts, as will be more fully described and particularly pointed out in the appended claims.

In the drawings, Figure 1 is a front elevation with parts broken away, Fig. 2 is a vertical section on the line *x—x* of Fig. 1, and Fig. 3 is an end elevation with parts broken away.

Referring more especially to the drawings, 1 represents a support or base piece to which is secured the cross sills 2, and the uprights 3. Suitable truss members 4, are provided, each extending from the uprights to the cross sills to thus hold them firmly in position. The parts 1, 2 and 3 are properly mortised together so that there can be no possible disengagement.

The uprights are suitably slotted at 5 and 6 to receive the clamping bolts 7, which pass through the slots and are held in proper position by washers 8 and lever taps 9. The front ends of the bolts are squared so as to prevent turning in the slots 5 and 6 and where they project beyond the uprights are provided with upstanding journal pins 10, upon which is secured the cylindrical socket arms 11, of the beams 12 and 13, which carry the currying knives 14 and 15. By loosening upon the lever taps the beams 12 and 13 with their carrying knives may be adjusted vertictally, the bolts traveling in the slots 5 and 6. By tightening up upon the lever taps 9 the socket arms 11 are pulled into engagement with the side of the uprights and are thus clamped in adjusted position. The knife 14 is on the rear of the beam 12 and the knife 15 is on the forward portion of the arm 13. Journaled in bearings in the uprights are the corrugated or plain feeding rollers 16 and 17, the former having its stub shaft 18 provided with a pinion 19, which meshes with a similar pinion 20, on a projecting stub shaft 21, of the roller 17. The latter shaft projects beyond the gear 20 and is squared to receive the operating crank 22. When treating a hide it is passed over the knife 15 between the beams 12 and 13 and over the knife 14 to the feeding rollers 16 and 17.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim and desire to secure by Letters Patent is:—

1. A leather treating machine comprising a pair of feeding rollers with means for operating the same, and a pair of adjustable currying knives.

2. A leather treating machine comprising a pair of feeding rollers with means for operating the same, and a pair of relatively staggered currying knives adjustable with relation to the feeding rollers.

3. A leather treating machine comprising a pair of feeding rollers with means for operating the same, a pair of currying knives, and means for adjusting said knives with relation to the feeding rollers, said adjusting means permitting relative adjustment with respect to the rollers.

4. In a device of the class described, the combination with a pair of uprights, of feeding rollers journaled therein, means for operating said feeding rollers, a pair of currying knife supporting bars, knives carried thereby, socketed arms projecting from the ends of the bars, and adjustable bolts
5 engaging said socketed arms to clamp them against the sides of the uprights.

In testimony whereof I have hereunto set my hand in presence of two subscribing witnesses.

WILLIAM P. BOAK.

Witnesses:
 O. L. MEEK,
 U. G. DAVIS.